United States Patent
Henderson et al.

(10) Patent No.: US 10,016,853 B2
(45) Date of Patent: Jul. 10, 2018

(54) DEEP TRAILING EDGE REPAIR

(71) Applicant: ANSALDO ENERGIA SWITZERLAND AG, Baden (CH)

(72) Inventors: Brian L. Henderson, Port Saint Lucie, FL (US); David R. Kaser, Clover, SC (US); Warren Martin Miglietti, Jupiter, FL (US); Andrew C. Pappadouplos, Fort Pierce, FL (US)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 759 days.

(21) Appl. No.: 14/211,643

(22) Filed: Mar. 14, 2014

(65) Prior Publication Data

US 2016/0375527 A1    Dec. 29, 2016

Related U.S. Application Data

(60) Provisional application No. 61/783,879, filed on Mar. 14, 2013, provisional application No. 61/783,904, filed on Mar. 14, 2013.

(51) Int. Cl.
*F01D 5/00* (2006.01)
*B23P 6/00* (2006.01)
(Continued)

(52) U.S. Cl.
CPC ............. *B23P 6/002* (2013.01); *B23H 9/10* (2013.01); *B23K 26/34* (2013.01); *B24B 19/14* (2013.01); *F01D 5/005* (2013.01); *F01D 5/18* (2013.01); *F01D 5/20* (2013.01); *B23K 2201/001* (2013.01); *B23P 6/007* (2013.01); *F05D 2220/32* (2013.01); *F05D 2230/12* (2013.01);
(Continued)

(58) Field of Classification Search
CPC ............... F01D 5/005; F05D 2230/80; F05D 2230/30–2230/314; B23P 6/002; B23P 6/007; B23H 9/10
See application file for complete search history.

(56) References Cited

U.S. PATENT DOCUMENTS

| | | | |
|---|---|---|---|
| 2003/0152716 A1* | 8/2003 | Hallen | C23C 8/60 427/580 |
| 2006/0137179 A1* | 6/2006 | Gorman | B23P 6/007 29/889.1 |

(Continued)

FOREIGN PATENT DOCUMENTS

| | | | | |
|---|---|---|---|---|
| WO | WO 2014/120152 A1 * | 1/2013 | | B21K 3/04 |

*Primary Examiner* — Christopher Besler
(74) *Attorney, Agent, or Firm* — Hovey Williams LLP

(57) ABSTRACT

A method for repairing a blade tip of a turbine blade based on welding below and above a designated depth recommended for repair of turbine blades. A damaged portion of the turbine blade is inspected to identify a standard cut portion and an angled cut portion. The standard cut portion is damaged above a standard cut line and the angled cut portion is damaged below the standard cut line. The damaged portion of the turbine blade is removed. The standard cut portion is removed using a first removal process and the angled cut portion is removed using a second removal process. The angled cut portion is built up with a first weld repair process. The angled cut portion is built up to the standard cut portion. The standard cut portion and the angled cut portion are built up with a second weld repair process.

17 Claims, 4 Drawing Sheets

(51) Int. Cl.
 *F01D 5/20* (2006.01)
 *B23H 9/10* (2006.01)
 *B23K 26/34* (2014.01)
 *B24B 19/14* (2006.01)
 *F01D 5/18* (2006.01)
 *B23K 101/00* (2006.01)
(52) U.S. Cl.
 CPC .... *F05D 2230/234* (2013.01); *F05D 2230/30* (2013.01); *F05D 2230/80* (2013.01); *F05D 2240/307* (2013.01); *Y10T 29/49318* (2015.01)

(56) References Cited

U.S. PATENT DOCUMENTS

| | | | | |
|---|---|---|---|---|
| 2008/0085395 | A1* | 4/2008 | Fernihough | B23P 6/007 428/131 |
| 2010/0297345 | A1* | 11/2010 | Jensen | B22F 5/04 427/142 |
| 2012/0000890 | A1* | 1/2012 | Ito | B23P 6/007 219/76.1 |
| 2012/0282108 | A1* | 11/2012 | Lee | F01D 5/20 416/97 R |

* cited by examiner

DEEP TRAILING EDGE REPAIR

CROSS-REFERENCE TO RELATED APPLICATIONS

This application claims priority to U.S. Provisional Application Ser. No. 61/783,879, filed Mar. 14, 2013, entitled "DEEP TRAILING EDGE REPAIR," and U.S. Provisional Application Ser. No. 61/783,904 filed Mar. 14, 2013, entitled "TURBINE BLADE TIP REPAIR," which are incorporated herein by reference in their entirety.

TECHNICAL FIELD

The present invention generally relates to repairing deep damage on the trailing edge of turbine blades. More specifically, the present invention relates to welding below and above a designated depth recommended for repair of turbine blades.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

The hot combustion gases are directed through a turbine section by turbine blades and vanes. Stationary turbine vanes precede each stage of rotating blades in order to direct the flow of hot combustion gases onto the blades at the appropriate angle to maximize turbine efficiency. These blades and vanes are subject to extremely high operating temperatures, stresses, and strains. The blades may include one or more cooling passages formed below the surface for the passage of cooling air. Nonetheless, gas turbine blades in particular, may experience degradation, such as wear, nicks, dents, and corrosion. Some degradation may be repairable which presents a viable alternative to the high-replacement costs of blades. Blade repairs vary depending on the blade configuration but repairs are generally directed to blade tips or tip shrouds, typically using a weld overlay process. Blade repair techniques continue to be improved to provide a repaired replacement part that functions just as well as a new part.

SUMMARY

Embodiments of the present invention provide a novel method and configuration for repairing turbine component damage, such as deep damage in the trailing edge, by providing welding below convention blade tip removal depth. In this regard, embodiments of the present invention improve the cost and turn-around time of deep blade repair in that the repair process expands the scope of damage that may be successfully repaired.

Repairing deep damage in the trailing edge includes preparing the geometry of the area to be repaired. Preparing the damage area includes removing distress damage from the blade and reviewing the blade tip for service. Damaged material may be cleaned out from the blade. Upon a determination to service the blade, the damaged portion of the blade is removed down to a specified cut level. The specified cut level may include a first portion at or above normal blade tip removal depth and a second portion below the normal blade tip removal depth. The second portion may be cut at varying angles from the vertical of the blade from a leading edge to a trailing edge. The damaged portion of the blade may be removed by a grinding process that removes the first portion and a machine process that removes the second portion with an angled cut. The inner cavities, including the ribs of the cooling passages, may become exposed on the surface with removal of the damaged material. The angled cut may be a sharp edge or a curved edge from the vertical extending away from the leading edge towards the trailing edge.

A welding repair process may be performed on the blade. Laser cladding may be performed on the angled cut using a powder alloy to build up the second portion to the level of the normal tip depth removal at the first portion. The laser cladding process may use material closer in composition and durability to the base material of the blade and different than the material used in repairing the damaged portion at or above the normal tip removal depth. However, it is also contemplated that same material could be used to build up both the damaged cut portion and the angled cut portion. Upon completion of the cladding process to build the angled cut of the second portion, the repair of the first portion and the second portion at or above the standard cut line may be performed.

Accordingly, in first embodiment of the present invention, a method for repairing a blade tip of a turbine blade is provided. The method includes inspecting a damaged portion of the turbine blade to identify a standard cut portion and an angled cut portion. The standard cut portion is damaged above a standard cut line and the angled cut portion is damaged below the standard cut line. The method also includes removing the damaged portion of the turbine blade. The standard cut portion is removed using a first removal process and the angled cut portion is removed using a second removal process. The method further includes building up the angled cut portion with a first weld repair process. The angled cut portion is built up to the standard cut portion. The method also includes building up the standard cut portion and the angled cut portion with a second weld repair process.

In a second embodiment of the present invention, a method for repairing a blade tip of a turbine blade is provided. The blade tip comprising an airfoil having a leading edge, a trailing edge, and a tip plate. The method includes inspecting a damaged portion of the turbine blade to identify a standard cut portion and an angled cut portion. The standard cut portion is damaged above a standard cut line and the angled cut portion is damaged below the standard cut line. The standard cut line is a designated standard depth for recommended repair of turbine blades. The method also includes removing the damaged portion of the blade. The standard cut portion is removed using a first removal process and the angled cut portion is removed using a second removal process. The first removal process is different from the second removal process. The standard cut portion is removed about the standard cut line, and the angled cut portion is removed at a predefined depth below the standard cut line. The method further includes building up the angled cut portion with a first weld repair process. The angled cut portion is built up to the standard cut portion.

The method also includes building up the standard cut portion with a second weld repair process.

In a third embodiment of the present invention, a method for repairing a blade tip of a turbine blade is provided. The blade tip comprising an airfoil having a leading edge, a trailing edge, and a tip plate. The method includes inspecting a damaged portion of the turbine blade to define a standard cut portion and an angled cut portion. The standard cut portion is damaged above a standard cut line and the angled cut portion is damaged below the standard cut line. The standard cut line is a designated standard depth recommended for repair of turbine blades. The method includes removing the damaged portion of the blade. The standard cut portion is removed using a first removal process and the angled cut portion is removed using a second removal process. The first removal process is a grinding process and the second removal process is a machining process. The standard cut portion is removed about a standard cut line, and the angled cut portion is removed at a predefined depth below the standard cut line. The method further includes building up the angled cut portion with a programmed angled weld repair process. The angled cut portion is built up to the standard cut portion. The weld repair process is laser cladding process. The laser cladding process uses a first material; the first material is a powder deposit material closer in composition to the base material of the turbine blade than a second material. The method also includes building up the standard cut portion and the angled cut portion with a weld repair process. The weld repair process uses the second material different from the first material.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
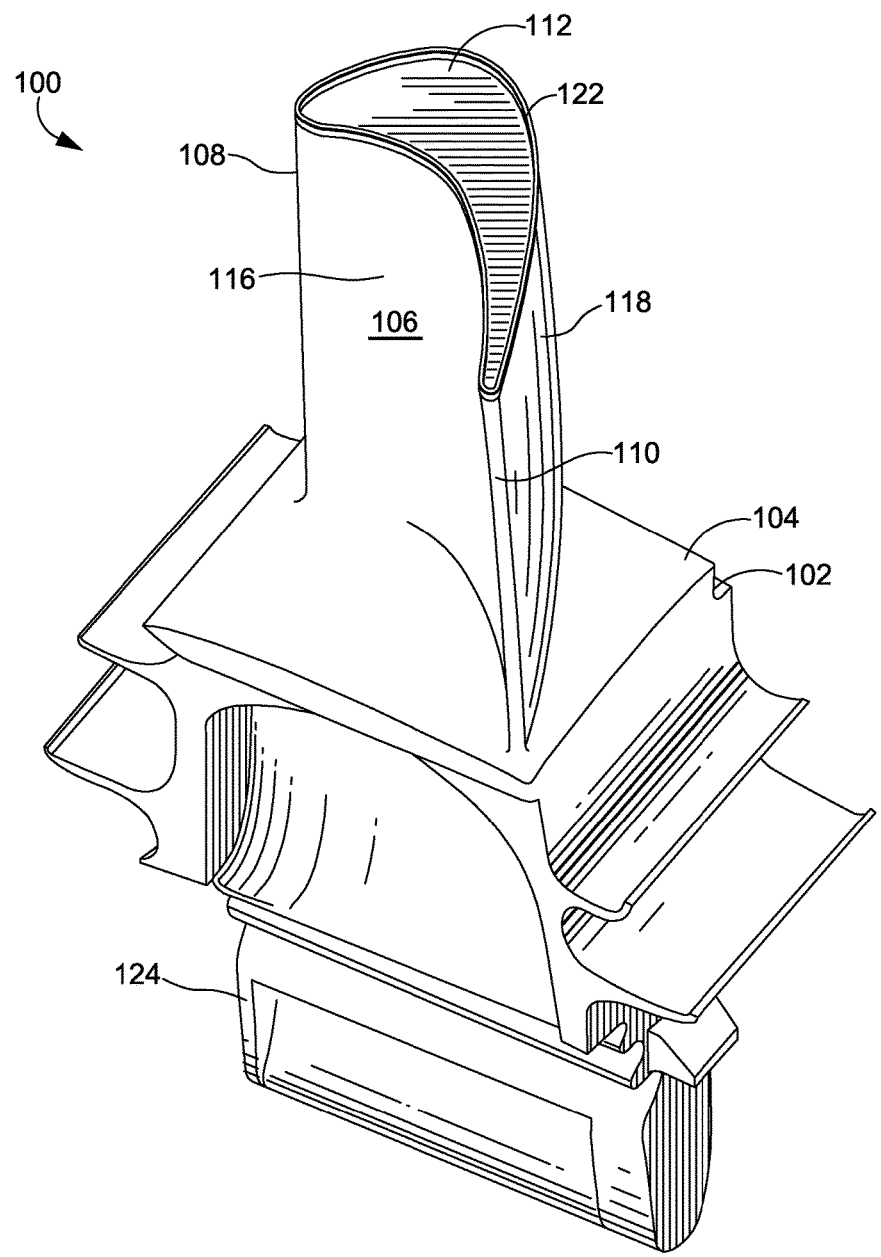
FIG. 1 is a perspective view of a turbine blade in accordance with an embodiment of the present invention.
Figure 2:
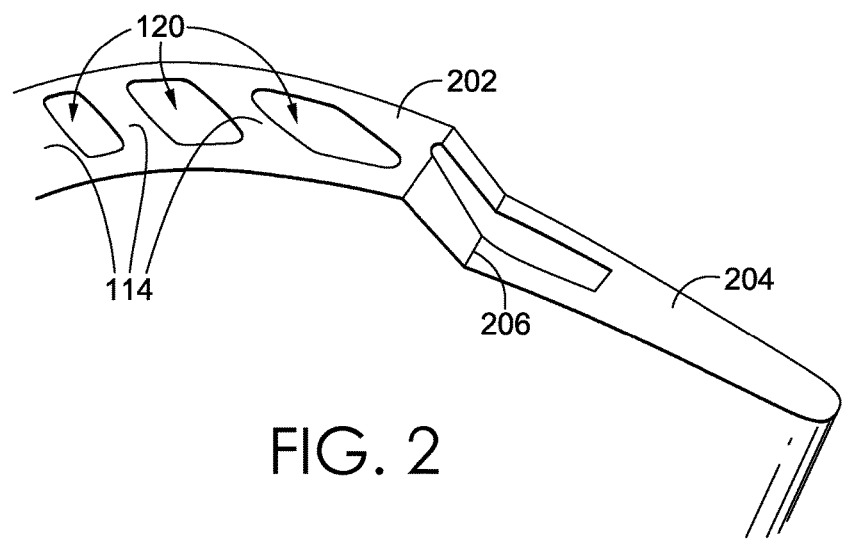
FIG. 2 is a perspective view of a turbine blade in repair, in accordance with an embodiment of the present invention.

Referring initially to FIG. 1, a gas turbine blade 100 includes a platform portion 102 having a generally planar gas path surface 104 and an airfoil 106 extending radially outward from the platform. The airfoil 106 includes a leading edge 108, a trailing edge 110, and a tip plate 112. In embodiments, the turbine blade 100 may further include a plurality of cooling passages 120 forming one or more ribs 114, as best shown in FIG. 2, and a squealer tip 122 extending above the tip plate 112. The airfoil 104 further includes a first sidewall 116 and a second sidewall 118. The first sidewall 116 is concave and defines a pressure side and the second sidewall 118 is convex and defines a suction side. The first sidewall 116 and second sidewall 118 extend longitudinally and radially outward from a root 124 to the tip plate 112. The tip plate 112 defines a radially outer boundary of airfoil 106. The tip plate 112 extends between the leading edge 108 and the trailing edge 110. The one or more ribs 114 of the plurality of cooling passages extend from the interior of the blade between the leading edge and the trailing edge.

Upon receiving a damaged blade, the damaged blade is reviewed for service. The airfoil trailing edge 110 is one of the thinnest regions of the airfoil 106, and it is a well-known location for crack initiation due to high thermal and mechanical stress imparted to the area. An ideal damaged blade for repair using processes described herein may include damage proximate the trailing edge. In addition, while traditional method would scrap blades with damage below the standard cut level, embodiments of this invention instead provide methods to perform an angled cut below the standard cut level to repair with a first material at the angled cut portion below the standard cut line, and repair both the standard cut portion and angled cut portion with a second material at or above the standard cut line. The standard cut level is located radially above the cooling channel. The standard cut level is generally identified such that repair at or above the standard cut level prevents disturbing the internal structure of a blade.

With continued reference to FIG. 2, the damaged portion of the blade is removed. The damaged portion may include the squealer tip 122 and the tip plate 112 of the blade tip. The damaged portion may include a standard cut portion and an angled cut portion. The standard cut portion is removed with a first process and the angled cut portion is removed with a second process. The standard cut portion may be cut at or above the standard cut level 202. The standard cut portion may be cut using a grinding or Electrical Discharge Machining process (EDM) process, or similar process, to cut the damaged portion at the standard cut level 202. The angled cut process may use a machining process or similar variation thereof to cut the angled cut portion. The machining process may be a wire EDM to create a deep angled cut 204 to an angle cut level 206 made extending away from the lead edge towards the trailing edge. The angled cut 204 may be a specific angle from the vertical. This angled cut 204 may vary depending on the location of the deep damage of at the trailing edge. Advantageously the angle cut 204 is at least 90 degrees calculating from the trailing edge to the leading edge. The angled cut 204 may also be a curve from the vertical extending toward the trailing edge.

Figure 3:
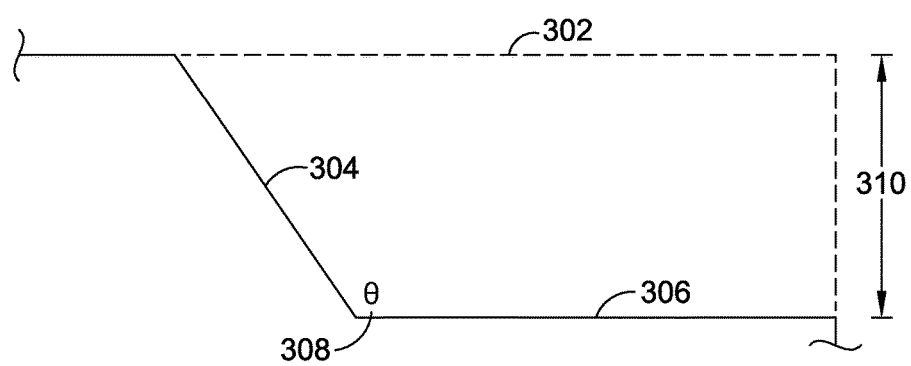
FIG. 3 is a schematic drawing of a turbine blade in repair, in accordance with an embodiment of the present invention.

With reference to FIG. 3, FIG. 3 illustrates the standard cut level 302 where the standard cut portion is removed. Upon removing the standard cut portion, the angled cut portion is removed with angled cut 304 down to the angled cut level 306. The angled cut 304 may create an angle 308 extending from the angled cut 304 down to the angle cut level 306. In this regard, the depth level of repair may be below the industry standard level cuts. By way of example, the cut or repair be 0.400 inches below the standard cut line such that where 11.384 inches for embodiments of the present invention instead of 11.784

Figure 4:
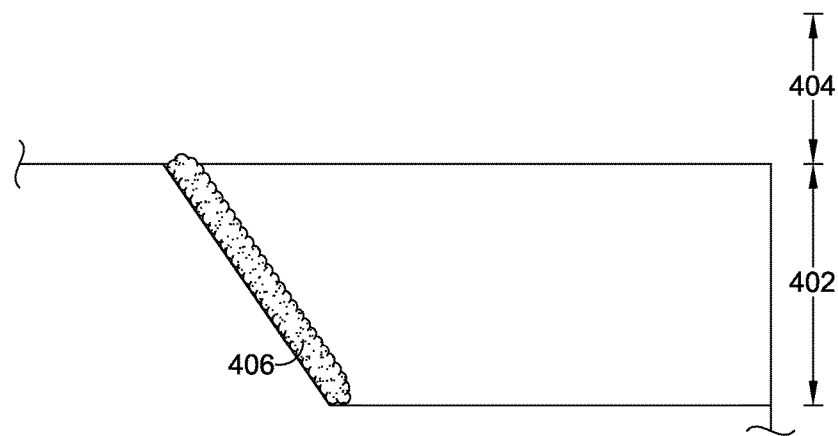
FIG. 4 is a perspective view of a turbine blade in repair, in accordance with an embodiment of the present invention.

With reference to FIG. 4, initially the damaged portion of the tip blade is weld repaired. The weld repair may perform an angled cut portion repair 402 and a standard cut portion and angle cut repair 404. The angled cut repair 402 may be a laser cladding process or by weld deposition process. In particular, the laser cladding that builds up cladding above the angled cut to build up the angled cut portion to the standard cut level. A composition 406 is provided initially in the form of a powder and is applied (e.g., as a layer) to the angled cut portion by fusing the powder to the angled cut portion. The weld deposition process may include providing the composition in a convenient physical form to feed it into a welding torch on the surface of the angled cut portion. Advantageously, the initial welding process may include the following parameters found to limit the amount of cracking and over deposit of filler material during the weld process. Filler material may include Merl 72, Haynes 230, Haynes 282 or other materials of similar composition. The filler material is close in composition to the base material of the blade. The base material may be, for example, a nickel-based super alloy. The laser or manual welding process may require power between 30 W and 12000 W and preferably 300 W to 9000 W at a travel rate 0.3 inches per minute to 500 inches per minute and a shield gas of $CO_2$ or Ar or any combination thereof. If there are internal cooling passages in the turbine blade the openings are reopened as necessary by a technique such as EDM.

The angled cut repair 402 process may include particular programming to accommodate welding at the angle provided at the angled cut portion. A traditional circumferential welding may not sufficient to weld the angled cut of the blade. Again, the material during the angled cut repair process may be the same but advantageously different from the material used for the standard cut repair process material in that the material is closer in composition to the base material of the blade. The material used for the angled cut portion may be stronger than the material used for the standard cut process. The stronger material may be machine blended into the base material.

Figure 5:
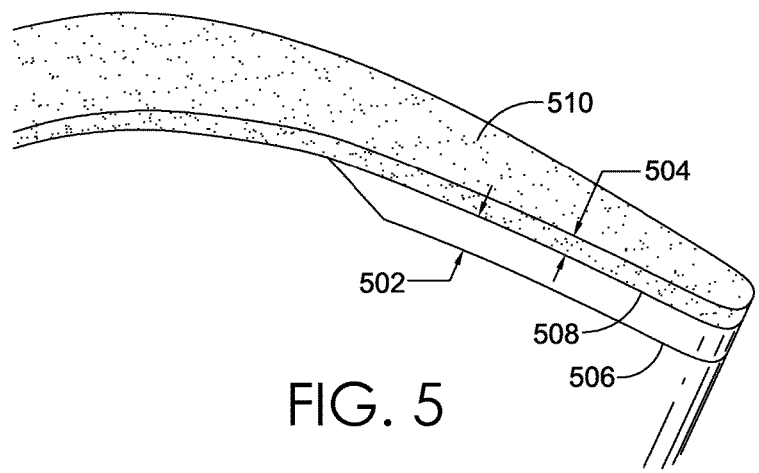
FIG. 5 is a perspective view of a turbine blade in repair, in accordance with an embodiment of the present invention.

With reference to FIG. 5, a standard cut repair 504 process may be used to repair the blade above both the standard cut level 508 and the angled cut level 506 in combination, upon completion of the angled cut repair process 502. After the angled cut repair 502 process, the repaired portion above the angled cut level 506 may be machined to provide contouring. Next, the standard cut repair is performed. The standard cut repair 504 process may include known methods for repairing blade above the standard cut line. For example, laser cladding may be used to create a build up 510 above the base in order to repair to the tip of the blade. Laser cladding may be performed using a second material as described hereinabove.

Figure 6:
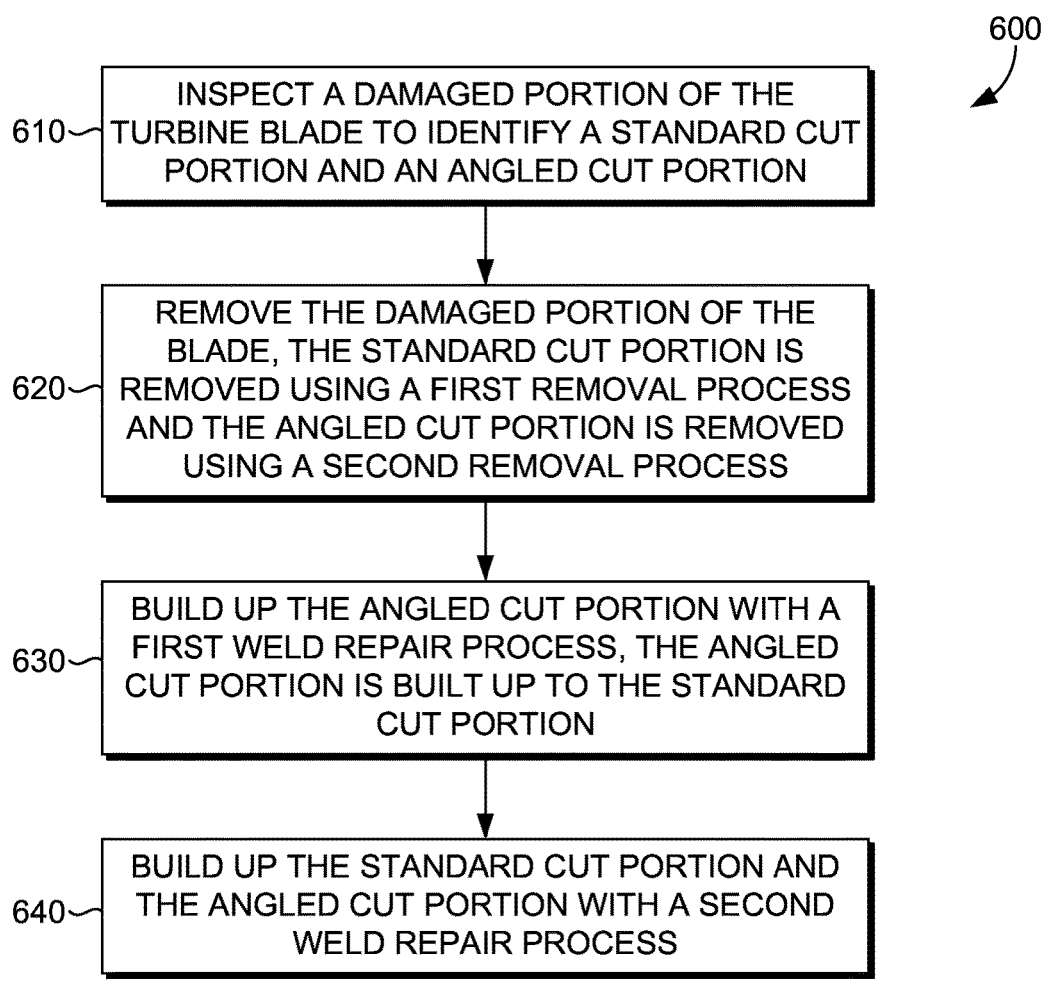
FIG. 6 is a flow diagram depicting deep trailing edge repair, in accordance with an embodiment of the present invention.

Turning now to FIG. 6, a flow diagram is provided that illustrates a method 600 for repairing a blade tip of a turbine blade. At block 610 a damaged portion of the turbine blade is inspected to identify a standard cut portion and an angled cut portion. The standard cut portion is damaged above a standard cut line and the angled cut portion is damaged below the standard cut line. At block 620, the damaged portion of the turbine blade is removed. The standard cut portion is removed using a first removal process and the angled cut portion is removed using a second removal process. At block 630, the angled cut portion is built up with a first weld repair process. The angled cut portion is built up to the standard cut portion. At block 640, the standard cut portion and the angled cut portion are built up with a second weld repair process. The tip is built using a welding process that forms a mechanical locking bead over the tip plate.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method for repairing a blade tip of a turbine blade, the method comprising:
inspecting a damaged portion of the turbine blade to identify a standard cut portion and an angled cut portion, the turbine blade including a platform, a tip, an airfoil extending in a radial direction from the platform to the tip, and one or more internal cooling passages enclosed by an outer surface of the airfoil and the tip, wherein the standard cut portion is damaged above, in the radial direction, a standard cut line, and wherein the angled cut portion is damaged below, in the radial direction, the standard cut line;
removing the damaged portion of the turbine blade including removing the standard cut portion using a first removal process, and then removing the angled cut portion using a second removal process, wherein removing the standard cut portion includes removing a first portion of the turbine blade to the standard cut line exposing the one or more internal cooling passages, and wherein removing the angled cut portion includes removing a second portion of the turbine blade below, in the radial direction, the standard cut line further exposing the one or more internal cooling passages;
building up a replacement angled cut portion with a first weld repair process, wherein the replacement angled cut portion is built up to the standard cut line; and then
building up a replacement standard cut portion above, in the radial direction, the replacement angled cut portion with a second weld repair process.

2. The method of claim 1, wherein the standard cut line is a designated depth recommended for repair of turbine blades.

3. The method of claim 1, wherein the first removal process is a grinding or an Electrical Discharge Machining (EDM) process.

4. The method of claim 1, wherein the second removal process is a machining process.

5. The method of claim 1, wherein the first weld repair process is a programmed angled weld process.

6. The method of claim 5, wherein the programmed angled weld process is a laser cladding process.

7. The method of claim 6, wherein the laser cladding process uses a first material, the first material is a powder deposit material closer in composition to a base material of the turbine blade than a second material used in the second weld process.

8. The method of claim 7, wherein the second weld repair process uses the second material different from the first material of the laser cladding process.

9. A method for repairing a blade tip of a turbine blade, the blade tip comprising an airfoil having a leading edge, a trailing edge, and a tip plate, the method comprising:
   inspecting a damaged portion of the turbine blade to identify a standard cut portion and an angled cut portion, the turbine blade including a platform, a tip, an airfoil extending in a radial direction from the platform to the tip, and one or more internal cooling passages enclosed by an outer surface of the airfoil and the tip, wherein the standard cut portion is damaged above, in the radial direction, a standard cut line, and the angled cut portion is damaged below, in the radial direction, the standard cut line, and wherein the standard cut line is a designated standard depth for recommended repair of turbine blades;
   removing the damaged portion of the blade including removing the standard cut portion using a first removal process, and then removing the angled cut portion using a second removal process, wherein removing the standard cut portion includes removing a first portion of the turbine blade to the standard cut line exposing the one or more internal cooling passages, and wherein removing the angled cut portion includes removing a second portion of the turbine blade at a predefined depth below, in the radial direction, the standard cut line further exposing the one or more internal cooling passages;
   building up a replacement angled cut portion with a first weld repair process, wherein the replacement angled cut portion is built up to the standard cut line, and then building up a replacement standard cut portion above, in the radial direction, the replacement angled cut portion with a second weld repair process.

10. The method of claim 9, wherein the first removal process is a grinding or an Electrical Discharge Machining (EDM) process and wherein the second removal process is a machining process.

11. The method of claim 9, wherein the second removal process for the angled cut portion comprises cutting a sharp edge extending away from the leading edge towards the trailing edge.

12. The method of claim 9, wherein the second removal process for the angled cut portion comprises cutting a curved edge extending away from the leading edge towards the trailing edge.

13. The method of claim 10, wherein the first weld repair process is an angled weld program.

14. The method of claim 13, wherein the angled weld program is a laser cladding process.

15. A method for repairing a blade tip of a turbine blade, the blade tip comprising an airfoil having a leading edge, a trailing edge, and a tip plate, the method comprising:
   inspecting a damaged portion of the turbine blade to define a standard cut portion and an angled cut portion, the turbine blade including a platform, a tip, an airfoil extending in a radial direction from the platform to the tip, and one or more internal cooling passages enclosed by an outer surface of the airfoil and the tip, wherein the standard cut portion is damaged above, in the radial direction, a standard cut line, and the angled cut portion is damaged below, in the radial direction, the standard cut line, and wherein the standard cut line is a designated standard depth recommended for repair of turbine blades;
   removing the damaged portion of the blade including removing the standard cut portion using a first removal process, and then removing the angled cut portion using a second removal process, wherein the first removal process is a grinding or an Electrical Discharge Machining process (EDM) process, wherein the second removal process is a machining process, wherein removing the standard cut portion includes removing a first portion of the turbine blade to a standard cut line exposing the one or more internal cooling passages, and wherein removing the angled cut portion includes removing a second portion of the turbine blade at a predefined depth below, in the radial direction, the standard cut line further exposing the one or more internal cooling passages;
   building up a replacement angled cut portion with a programmed angled weld repair process, wherein the replacement angled cut portion is built up to the standard cut line, wherein the angled weld repair process is laser cladding process, wherein the laser cladding process uses a first material, the first material is a powder deposit material closer in composition to a base material of the turbine blade than a second material; and then
   building up a replacement standard cut portion above, in the radial direction, the replacement angled cut portion with a weld repair process, wherein the weld repair process uses the second material different from the first material.

16. The method of claim 15, wherein the machining process for the angled cut portion comprises cutting a sharp edge or a curved edge extending away from the leading edge towards the trailing edge.

17. The method of claim 15, wherein the blade tip further comprises a plurality of cooling passages forming one or more ribs, wherein the cooling passages are reopened as necessary by Electronic Discharge Machining.

* * * * *